US008494959B2

(12) United States Patent
Hathaway et al.

(10) Patent No.: US 8,494,959 B2
(45) Date of Patent: Jul. 23, 2013

(54) PAYMENT CARD WITH DYNAMIC ACCOUNT NUMBER

(75) Inventors: Matthew Hathaway, Watertown, MA (US); Dana E. Wolf, Newton, MA (US); Skye Spear, Brighton, MA (US)

(73) Assignee: EMC Corporation, Hopkinton, MA (US)

( * ) Notice: Subject to any disclaimer, the term of this patent is extended or adjusted under 35 U.S.C. 154(b) by 1074 days.

(21) Appl. No.: 11/840,629

(22) Filed: Aug. 17, 2007

(65) Prior Publication Data

US 2009/0048971 A1    Feb. 19, 2009

(51) Int. Cl.
*G06Q 40/00*    (2012.01)
(52) U.S. Cl.
USPC .............................................. 705/41; 705/38
(58) Field of Classification Search
USPC ....................................................... 705/41, 38
See application file for complete search history.

(56) References Cited

U.S. PATENT DOCUMENTS

| | | | |
|---|---|---|---|
| 4,720,860 A | | 1/1988 | Weiss |
| 4,800,590 A | * | 1/1989 | Vaughan ........................ 713/184 |
| 5,168,520 A | | 12/1992 | Weiss |
| 5,193,114 A | * | 3/1993 | Moseley ........................ 713/183 |
| 5,317,636 A | * | 5/1994 | Vizcaino ........................ 705/65 |
| 5,361,062 A | | 11/1994 | Weiss et al. |
| 6,089,451 A | | 7/2000 | Krause |
| 6,561,430 B2 | * | 5/2003 | Ou .................................. 235/487 |
| 6,641,050 B2 | | 11/2003 | Kelley et al. |
| 6,883,717 B1 | | 4/2005 | Kelley et al. |
| 7,051,929 B2 | * | 5/2006 | Li .................................. 235/380 |
| 7,100,821 B2 | * | 9/2006 | Rasti .............................. 235/380 |
| 7,136,835 B1 | | 11/2006 | Flitcroft et al. |
| 7,472,829 B2 | * | 1/2009 | Brown ........................ 235/382.5 |

(Continued)

FOREIGN PATENT DOCUMENTS

| | | |
|---|---|---|
| CA | 2469445 | 12/2005 |
| FR | 2835078 | 7/2003 |
| WO | 2006036363 | 4/2006 |
| WO | 2007025954 | 3/2007 |

OTHER PUBLICATIONS

Innovative Card Technologies, "ICT DisplayCard," Feb. 2007, 2 pages.
Tri-D Systems, Inc., "Biometric Proximity Card for Physical Access," 2005-2007, 1 page.
CR80 News, "On-Card Displays Become Reality, Making Cards More Secure," Sep. 2006, 2 pages.

(Continued)

*Primary Examiner* — Thomas Dixon
*Assistant Examiner* — Benjamin S Fields
(74) *Attorney, Agent, or Firm* — Ryan, Mason & Lewis, LLP

(57) ABSTRACT

A payment card comprises a processor, a trigger source coupled to the processor, and a display for outputting at least a portion of a dynamic account number under control of the processor responsive to the trigger source. The dynamic account number is determined based at least in part on a seed stored in the payment card and an output of the trigger source. In an illustrative embodiment, the dynamic account number is generated utilizing a time-based or event-based one-time password algorithm. For example, in a time-based embodiment, the trigger source may comprise a time of day clock, with the dynamic account number being determined based at least in part on the seed and a current value of the time of day clock. In an event-based embodiment, the trigger source may comprise an event counter, with the dynamic account number being determined based at least in part on the seed and a current value of the event counter.

22 Claims, 8 Drawing Sheets

U.S. PATENT DOCUMENTS

| | | | |
|---|---|---|---|
| 2001/0029485 A1 | 10/2001 | Brody et al. | |
| 2002/0043566 A1 | 4/2002 | Goodman et al. | |
| 2006/0242698 A1* | 10/2006 | Inskeep et al. | 726/20 |
| 2007/0057037 A1* | 3/2007 | Woronec | 235/380 |
| 2007/0250920 A1* | 10/2007 | Lindsay | 726/7 |
| 2009/0048971 A1* | 2/2009 | Hathaway et al. | 705/41 |
| 2009/0063802 A1* | 3/2009 | Johnson et al. | 711/164 |
| 2009/0313687 A1* | 12/2009 | Popp et al. | 726/9 |

OTHER PUBLICATIONS

B. Schneier, Schneier on Security, "On-Card Displays," Sep. 2006, pp. 1-15.
K. Cameron, "The Laws of Identity," Microsoft Corporation, May 12, 2005, pp. 1-12.
Microsoft Corporation, A Technical Reference for InfoCard v1.0 in Windows, Aug. 2005, pp. 1-36.

* cited by examiner

PAYMENT CARD WITH DYNAMIC ACCOUNT NUMBER

FIELD OF THE INVENTION

The present invention relates generally to credit cards and other types of payment cards, and more particularly to techniques for enhancing the security of such cards as well as transactions involving such cards.

BACKGROUND OF THE INVENTION

As is well known, payment cards such as credit cards and debit cards are widely used in point-of-sale and online transactions. Unfortunately, conventional payment cards can be subject to unauthorized use if lost or stolen.

A number of techniques have been developed which attempt to increase the security of a payment card. One example is described in U.S. Patent Application Publication No. 2002/0043566, entitled "Transaction Card and Method for Reducing Frauds." In this approach, a card is provided with a counter that increments each time the card is activated. This counter value is used with a key string in a cryptographic algorithm to produce a signature. The signature is transmitted with other data to a server of a bank, credit card provider or security department. The server uses the signature and other transmitted data to determine if the transaction is valid.

Another example of a conventional approach is described in U.S. Patent Application Publication No. 2005/0252961, entitled "Charge Card and Debit Transactions Using a Variable Charge Number." In this approach, a different charge number is assigned for every charge transaction. The card does not contain the entire string of numbers that are required for charging. Instead, the charge number is constructed as a combination of the card number and a variable, random number generated through a pre-authorization phase. A new random number is issued for every charge, is good for a maximum pre-authorized charge amount and a specific merchant, and expires after a limited period of time.

These and other conventional techniques, however, fail to provide an adequate solution to the problem. For example, the use of a separate signature requires significant modification of the currently deployed payment card authentication infrastructure, which is clearly undesirable. Also, the use of a separate pre-authorization phase for every transaction can introduce undue delay in the processing of point-of-sale and online transactions.

Accordingly, a need exists for an improved approach to providing enhanced security in a credit card or other type of payment card.

SUMMARY OF THE INVENTION

The present invention in one or more of the illustrative embodiments described herein meets the above-identified need by providing a dynamic secure payment card in which a portion of a payment card number itself is varied under the control of a time-based or event-based cryptographic one-time password algorithm.

In accordance with one aspect of the invention, a payment card comprises a processor, a trigger source coupled to the processor, and a display for outputting at least a portion of a dynamic account number under control of the processor responsive to the trigger source. The dynamic account number is determined based at least in part on a seed stored in the payment card and an output of the trigger source.

As noted above, the dynamic account number in an illustrative embodiment is generated utilizing a time-based or event-based one-time password algorithm. For example, in a time-based embodiment, the trigger source may comprise a time of day clock, with the dynamic account number being determined based at least in part on the seed and a current value of the time of day clock. In an event-based embodiment, the trigger source may comprise an event counter, with the dynamic account number being determined based at least in part on the seed and a current value of the event counter. Numerous other embodiments, utilizing other types of trigger sources, are also possible. For example, hybrid arrangements involving combinations of both time-based and event-based triggers may be used.

In one of the illustrative embodiments, the dynamic account number may comprise a first portion that is fixed and a second portion that is variable, with the second portion being generated under control of the payment card processor for presentation on the payment card display. The fixed first portion of the dynamic account number may be, for example, embossed, engraved or otherwise imprinted onto a surface of the payment card, and may comprise a designated number of initial digits of the dynamic account number. The variable second portion may comprise a designated number of final digits of the dynamic account number, and as noted above may be presented via the display.

Another aspect of the invention relates to a server comprising a processor coupled to a memory. The server may be configured to receive the dynamic account number and to determine therefrom a corresponding static account number. For example, the server may comprise a decryption server coupled between a merchant entity of a payment card processing system and an issuing bank entity of the system, with the decryption server being configured to process a verification request containing the dynamic account number and to generate a modified verification request containing the corresponding static account number.

Yet another aspect of the invention relates to a payment card processing system which comprises a plurality of payment cards, one or more of which generate dynamic account numbers of the type described above. The system further includes at least one host device configured for communication with one or more of the payment cards, and at least one server configured for communication with the host device. The dynamic account number is provided to the host device and communicated from the host device to the server, and the server is configured to determine from the dynamic account number a corresponding static account number. The system may further include a number of additional payment card processing entities, such as, for example, one or more of merchant, acquiring processor, card association, issuing processor and issuing bank entities.

The illustrative embodiments advantageously overcome the drawbacks of the conventional approaches previously described herein. For example, the illustrative embodiments avoid the need for generation and transmission of a separate signature and the corresponding substantial modification of payment card authentication infrastructure. Also, the illustrative embodiments eliminate the need for a separate pre-authorization phase for every transaction, thereby avoiding the associated processing delay.

These and other features and advantages of the present invention will become more readily apparent from the accompanying drawings and the following detailed description.

DETAILED DESCRIPTION

The present invention will be described herein with reference to exemplary dynamic secure payment cards and an associated payment card processing system. It is to be appreciated, however, that the invention is not restricted to use with the particular illustrative device and system configurations shown.

Figure 1:
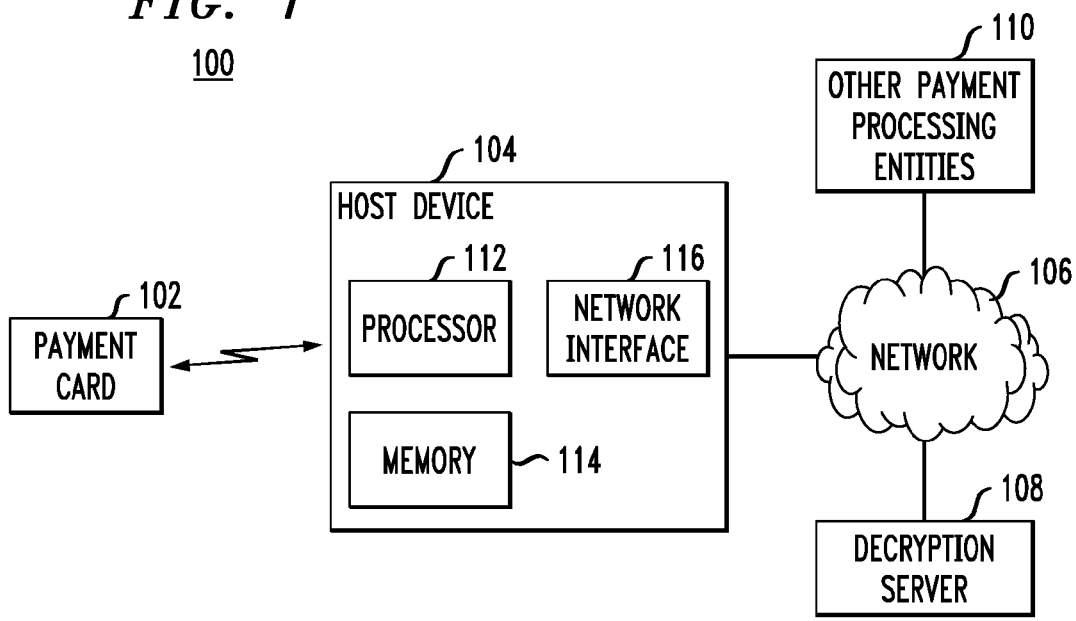
FIG. 1 is a block diagram showing one example of a payment card processing system in an illustrative embodiment of the invention.

FIG. 1 shows an example of a payment card processing system 100 which includes a payment card 102, a host device 104, a network 106, a decryption server 108 and one or more additional payment processing entities 110. The payment card is configured to generate dynamic account numbers utilizing a time-based or event-based one-time password (OTP) algorithm as will be described in greater detail below. At least a portion of a given such dynamic account number may be presented to a user via a display of the payment card, such that the user can manually enter the dynamic account number into a user interface of the host device 104. Alternatively, a given dynamic account number may be communicated directly from the payment card via a wired or wireless connection between that device and the host device. By way of example, the payment card may be configured to communicate with the host device 104 via a wired connection such as a USB interface, or via a wireless connection such as an RFID, Bluetooth or IEEE 802.11 connection. As another example, the payment card may incorporate a magnetic stripe emulator, for embodiments in which the dynamic account number of the payment card is determined through scanning by a host device comprising a point-of-sale terminal with a magnetic stripe reader.

The term "dynamic account number" as used herein is intended to be construed broadly, so as to encompass, for example, at least a portion of a typical 16-digit credit card number or debit card number, as well as other types of account numbers, including, for example, at least a portion of a card verification value (CVV). Thus, a given dynamic account number itself need not comprise sufficient information to complete a transaction, but may be used in conjunction with other information to complete the transaction. A dynamic account number may comprise one or more numbers associated with a payment card account.

The host device 104 may comprise a desktop or portable personal computer, point-of-sale terminal, mobile telephone, personal digital assistant (PDA), wireless email device, workstation, kiosk, television set-top box, game console, or any other information processing device that supports transmission of payment card information for verification in a payment card processing system.

It should also be noted that a given payment card need not take the form of a typical conventional credit card or debit card. For example, such a payment card may be incorporated into another processing device, such as a computer, mobile telephone, etc. The term "payment card" as used herein is therefore intended to be construed broadly, so as to encompass a wide variety of processing devices that may be configured to generate dynamic account numbers in accordance with the techniques of the invention. Processing devices so configured are considered to be part of the present invention.

The network 106 may comprise, for example, a global computer network such as the Internet, a wide area network (WAN), a local area network (LAN), a satellite network, a telephone or cable network, or various portions or combinations of these and other types of networks.

The decryption server 108 in the illustrative embodiments is configured to process a dynamic account number and possibly other information in order to generate a static account number that is suitable for processing in a typical payment card verification process. The term "decryption" in this context is intended to be construed broadly, and should not be viewed as requiring explicit decryption of an entire account number. For example, in one of the embodiments described below, a dynamic account number has a fixed first portion and a variable second portion, with only the second portion being generated using an OTP algorithm. In such an embodiment, the decryption server may be configured to process the dynamic account number by translating the variable second portion to a corresponding portion of the static account number. The decryption server therefore generally needs to be configured with the same secret information or other seed that is utilized by the OTP algorithm implemented in the payment card.

The other payment processing entities 110 may include entities typically associated with verification of payment card information in a payment card processing system, such as, for example, entities associated with a merchant, an acquiring processor, a card association, an issuing processor and an issuing bank. Such entities may be implemented using one or more processing platforms comprising computers, servers or other processing devices in any combination. Operations performed by these and other system elements will be described below in conjunction with FIGS. 5 through 8.

It is to be appreciated that a given embodiment of the system 100 may include multiple instances of payment card 102, host device 104, decryption server 108, and possibly other system components, although only single instances of such components are shown in the simplified system diagram for clarity of illustration.

Figure 2:
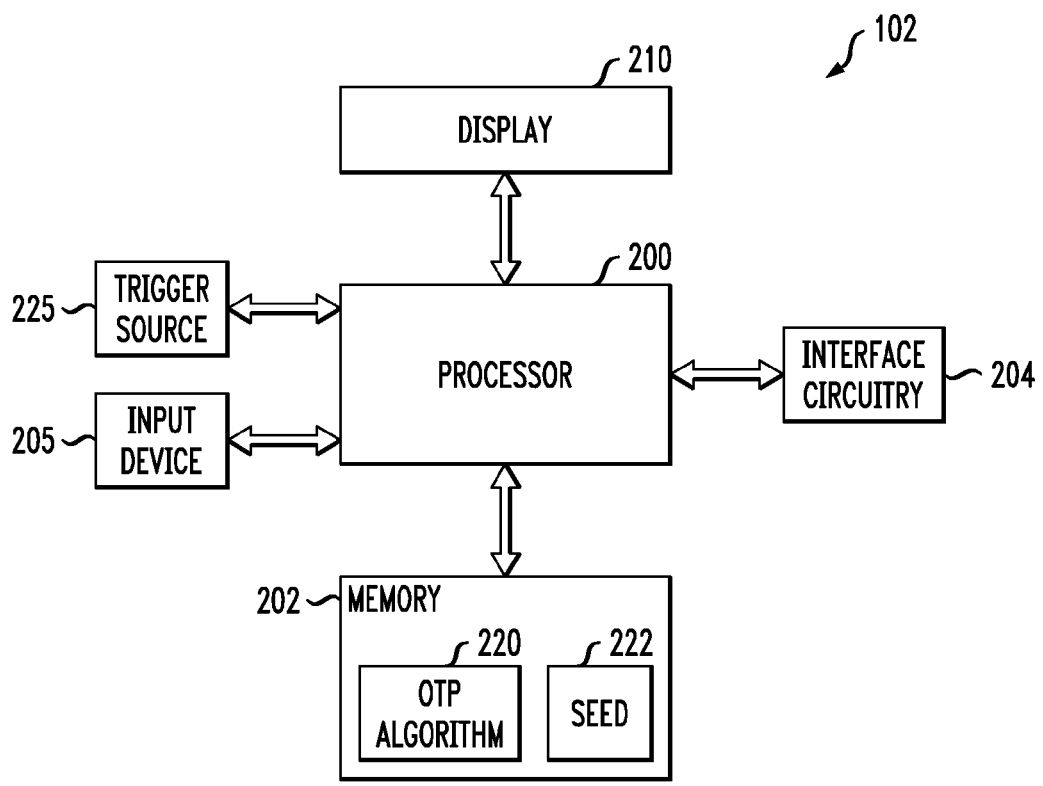
FIG. 2 is a block diagram of a payment card of the FIG. 1 system.

Referring now to FIG. 2, a more detailed illustrative implementation of payment card 102 is shown. The payment card in this embodiment comprises a processor 200 coupled to a memory 202. In other embodiments, at least a portion of the memory may be internal to the processor. Thus, although shown as a separate element in FIG. 2, memory 202 may be implemented in whole or in part using internal memory of the processor.

Processor 200 is also coupled to interface circuitry 204 which may comprise, for example, circuitry for interfacing the payment card 102 to the host device 104 via a wired or wireless connection, or circuitry for implementing the above-noted magnetic stripe emulator. Thus, the interface circuitry may include, for example, wired or wireless interface circuitry such as USB, RFID, Bluetooth, IEEE 802.11 circuitry, or magnetic stripe emulation circuitry, and associated drivers, connectors, antennas or structural elements, in any combination. A given embodiment of the invention may therefore utilize, for example, near field communication (NFC) techniques, of a type known in the art, or any other technique for communicating a dynamic account number and possibly other related information between the payment card and another system entity.

The payment card 102 further comprises an input device 205 which may comprise, for example, a single button or a keypad. In one embodiment, a user enters a personal identification number (PIN) via an input device comprising a keypad, and then depresses a particular button of the keypad, such as a * button, to activate the dynamic account number generation feature of the payment card. In a single-button embodiment, this feature is activated by simply pressing the designated button. Other types of input devices that may be utilized in a payment card in accordance with the invention include, for example, biometric sensors such as fingerprint or voice detectors. Such biometric sensors may be used in place of or in combination with the above-noted button or keypad.

Also included in the payment card 102 as shown in FIG. 2 is a display 210. This display, which may comprise an LCD display or other suitable display, is utilized to display at least a portion of a dynamic account number generated by the processor 200. In generating such a dynamic account number, the processor utilizes an OTP algorithm 220 that may be stored as program code in the memory 202. The OTP algorithm utilizes a seed 222 also stored in the memory. The term "seed" as used herein is intended to be construed broadly so as to encompass, for example, any type of cryptographic key or other secret information that is utilized by the OTP algorithm to generate the dynamic account number. The OTP algorithm may comprise, for example, a conventional hashing algorithm that takes as its inputs the seed as well as current time or event counter values, and possibly other information. The program code implementing the OTP algorithm is executed by the processor responsive to input from a trigger source 225, which may comprise, for example, a time of day clock in a time-based embodiment, or an event counter in an event-based embodiment.

More specifically, in a time-based embodiment, an internal time of day clock, or other type of clock, is used as a trigger source. Trigger sources for time-based embodiments may be implemented using conventional clock circuitry of a type well known to those skilled in the art, such as crystal oscillators. In such an embodiment, the dynamic account number may be generated by the OTP algorithm using the current time in combination with the seed. For an event-based embodiment, an event counter may count any of a number of different events, such as the number of activations of the card via the above-described input device 205. Thus, each activation of the card may be used to trigger the OTP algorithm to generate a new dynamic account number. The algorithm may utilize the seed in combination with the current event count value to generate the dynamic account number. In other embodiments, the dynamic account number could be generated based on the seed in combination with the previous dynamic account number. Counter circuitry suitable for use in event-based embodiments is also well known in the art, and therefore not described in detail herein.

Although the input device 205 is shown as being separate from the trigger source 225 in the FIG. 2 embodiment, this is by way of example and not limitation. In other embodiments, the trigger source may be the input device itself, alone or in combination with other circuitry or card elements. For example, a single button or a keypad of a given input device may serve as a trigger source in an event-based implementation.

Conventional aspects of OTP algorithms suitable for use with the present invention are described in, for example, U.S. Pat. No. 4,720,860, entitled "Method and Apparatus for Positively Identifying an Individual," U.S. Pat. No. 5,168,520, entitled "Method and Apparatus for Personal Identification," and U.S. Pat. No. 5,361,062, entitled "Personal Security System," all of which are incorporated by reference herein. Embodiments of the invention may also make use of OTP generation techniques similar to those utilized in commercially-available authentication tokens. An example of such an authentication token is the RSA SecurID® user authentication token, commercially available from RSA, The Security Division of EMC Corporation, of Bedford, Mass., U.S.A.

It should be noted that other types of payment cards may be implemented using the techniques of the invention, including, for example, hybrid payment cards that utilize a combination of time-based and event-based trigger sources to control generation of a dynamic account number using an OTP algorithm.

The processor 200 may be, for example, a microprocessor, a microcontroller, or another type of digital data processor. Such a processor may comprise, for example, internal random access memory (RAM), internal read-only memory (ROM), and a register file. The register file may comprise, for example, control and status registers, special function registers, or other types of registers. Such a register file typically contains information about the current state of the processor and information used to control the operation of the processor. The processor will also generally include additional elements such as an instruction decoder, arithmetic logic units, and other elements typically found in a conventional processor, although such elements are not explicitly shown in the figure. As was indicated previously, and will be readily appreciated by those skilled in the art, portions of a dynamic account number generation process in accordance with an embodiment of the invention can be implemented at least in part in the form of one or more software programs that are stored at least in part in memory 202 and executed by processor 200.

Various payment card elements such as elements 200, 202, 204 and 225 of FIG. 2 may be implemented in whole or in part utilizing a conventional microprocessor, microcontroller, digital signal processor, application-specific integrated circuit (ASIC) or other type of circuitry, as well as portions or combinations of such circuitry elements. For example, these elements may be incorporated into a microprocessor-based flexible display module that also includes the display 210. The payment card 102 also includes a power source, such as a thin, flexible battery, although such a source is omitted from the figure for simplicity and clarity. Other conventional elements typically used in smart cards or other similar devices may be incorporated into a given embodiment of the payment card 102.

Figure 3A:
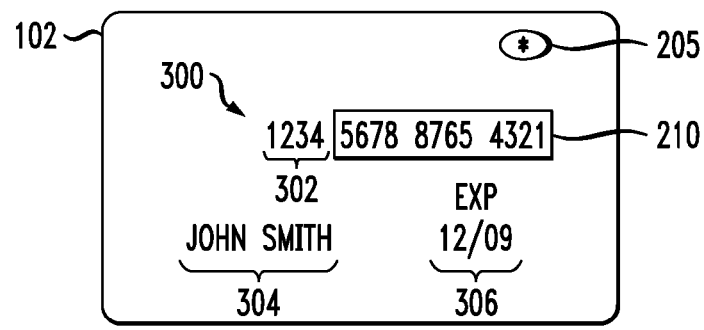
FIG. 3A shows a frontal view of one possible implementation of a payment card of the FIG. 1 system.

FIG. 3A shows one possible implementation of the payment card 102. The figure shows only the front of the card, but it should be understood that the back may include typical elements such as a magnetic stripe and an area for user signature. In this embodiment, the payment card is similar to a typical embossed credit or debit card, but includes a 16-digit dynamic account number 300. The dynamic account number includes a fixed portion 302, comprising the first four digits, as well as a variable portion that is presented on display 210. The variable portion comprises the final 12 digits of the dynamic account number. Also included on the card is typical embossed information such as card holder name 304 and expiration date 306. The card includes an input device 205 comprising a single button 205 that when activated causes the card to generate a new dynamic account number using time-based or event-based OTP techniques, or combinations thereof, as previously described.

It should be noted that the fixed portion 302 of the dynamic account number need not be embossed into the card. For example, other imprinting techniques, such as laser engraving, may be used. More generally, any technique for presenting the fixed portion of the dynamic account number in a visually-perceptible manner may be used.

Figure 3B:
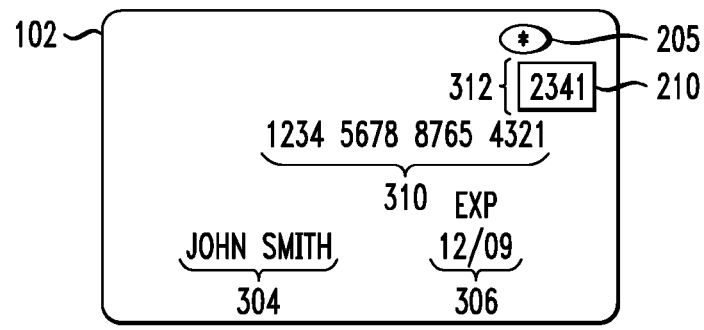
FIG. 3B shows a frontal view of another possible implementation of a payment card of the FIG. 1 system.

In other embodiments, the entire account number 300 may be made variable and presented on the display 210. Alternatively, other portions of the account number may be made variable, such as only the final eight digits, only the final four digits, and so on. Also, as indicated previously, the input device 205 may be configured to include a keypad rather than a single button as in the FIG. 3A embodiment. As another example, other types of account numbers on the card 102 may be made dynamic, such as the above-noted CVV. Thus, in a given embodiment, the 16-digit account number 300 may be made entirely fixed, but at least a portion of an associated CVV may be made variable in the manner previously described. FIG. 3B illustrates an example of an arrangement of this type. In this particular example, a 16-digit account number 310 is fixed in its entirety but a corresponding CVV 312 is variable and presented on display 210. It was mentioned above that such a CVV is considered a type of dynamic account number as the latter term is used herein. In other embodiments, the CVV may be used in a manner similar to its usage in conventional practice, for example, as additional verification information processed along with the dynamic account number.

Figure 4:
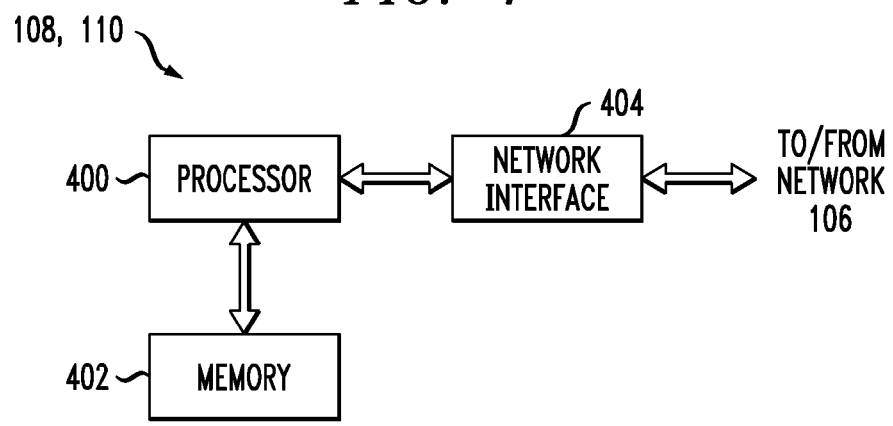
FIG. 4 is a block diagram of a decryption server or other payment processing entity of the FIG. 1 system.

FIG. 4 illustrates the general configuration of the decryption server 108 or other payment processing entities 110 in the system 100. A given one of these system elements as shown comprises a processor 400 coupled to a memory 402 and a network interface 404. The processor 400 executes software program code stored in memory 402 to implement the functionality of the given element. Network interface 404 is configured to support communication between the given element and other elements of the system, such as host device 104. As indicated previously, the decryption server and other payment processing entities may each be implemented on a separate processing platform, or two or more of such elements may be combined into a single processing platform.

The manner in which the dynamic account number may be processed in the system 100 by decryption server 108 and other payment processing entities 110 will now be described with reference to FIGS. 5 through 8. It will be assumed for these embodiments that a merchant denoted by reference numeral 500 comprises a point-of-sale terminal or web server configured to obtain the dynamic account number from the payment card 102. Thus, the merchant 500 may comprise, for example, host device 104 implemented as a point-of-sale terminal, or one of the other payment processing entities 110 implemented as a web server. Such a web server may provide online transaction capabilities via one or more web pages accessible to a user via host device 104 implemented as a personal computer, mobile telephone, PDA or other user device. Also shown in the embodiments of FIGS. 5 through 8 are additional payment processing entities including an acquiring processor 502, a card association 504, an issuing processor 506 and an issuing bank 508. Each of these processing entities may comprise one or more processing devices having the general configuration shown in FIG. 4. Conventional aspects of the processing operations performed by such elements in a payment processing system are well understood in the art and therefore not described in detail herein. Numerous other configurations may be used for these and other system elements.

Figure 5:
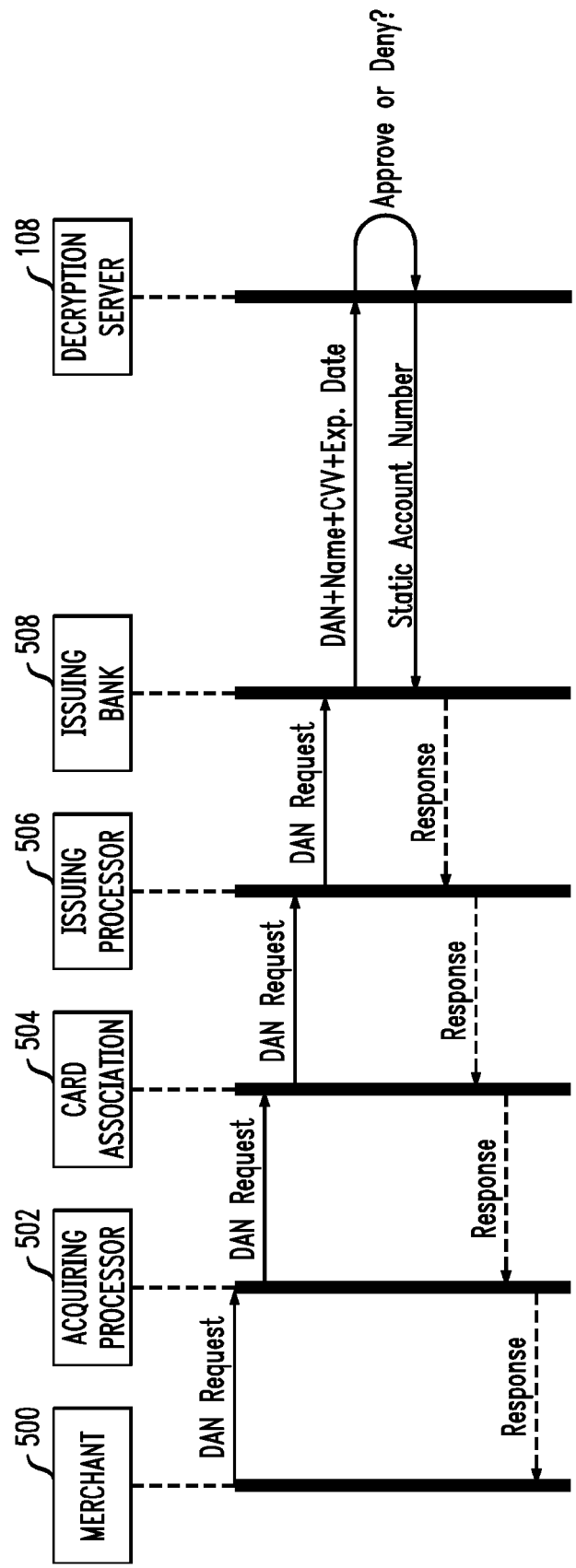
FIGS. 5 through 8 are flow diagrams of exemplary processing operations that may be implemented in the FIG. 1 system.

Referring initially to FIG. 5, this diagram shows the manner in which the dynamic account number is processed by the above-noted system elements. The merchant 500 receives the dynamic account number generated by the payment card 102, and transmits a corresponding dynamic account number verification request, denoted a DAN request in the figure. This request is passed from the acquiring processor 502 to the card association 504 to the issuing processor 506 and then to the issuing bank 508. It is assumed that the DAN request in this embodiment includes, in addition to the dynamic account number, other relevant payment card information including the card holder name, CVV and expiration date. The issuing bank provides the dynamic account number, card holder name, CVV and expiration date to the decryption server 108. The decryption server generally converts the dynamic account number to a static account number that is of a conventional type recognized by the system, and may make use of conventional techniques for verification of OTPs. Thus, the decryption server 108 in this embodiment may be similar to a conventional authentication server that is utilized to authenticate OTPs such as those generated by the above-noted RSA SecurID® user authentication token. Return of the static account number by the decryption server to the issuing bank is indicative of approval of the transaction. This response is passed from the issuing bank back to the merchant as shown.

Figure 6:
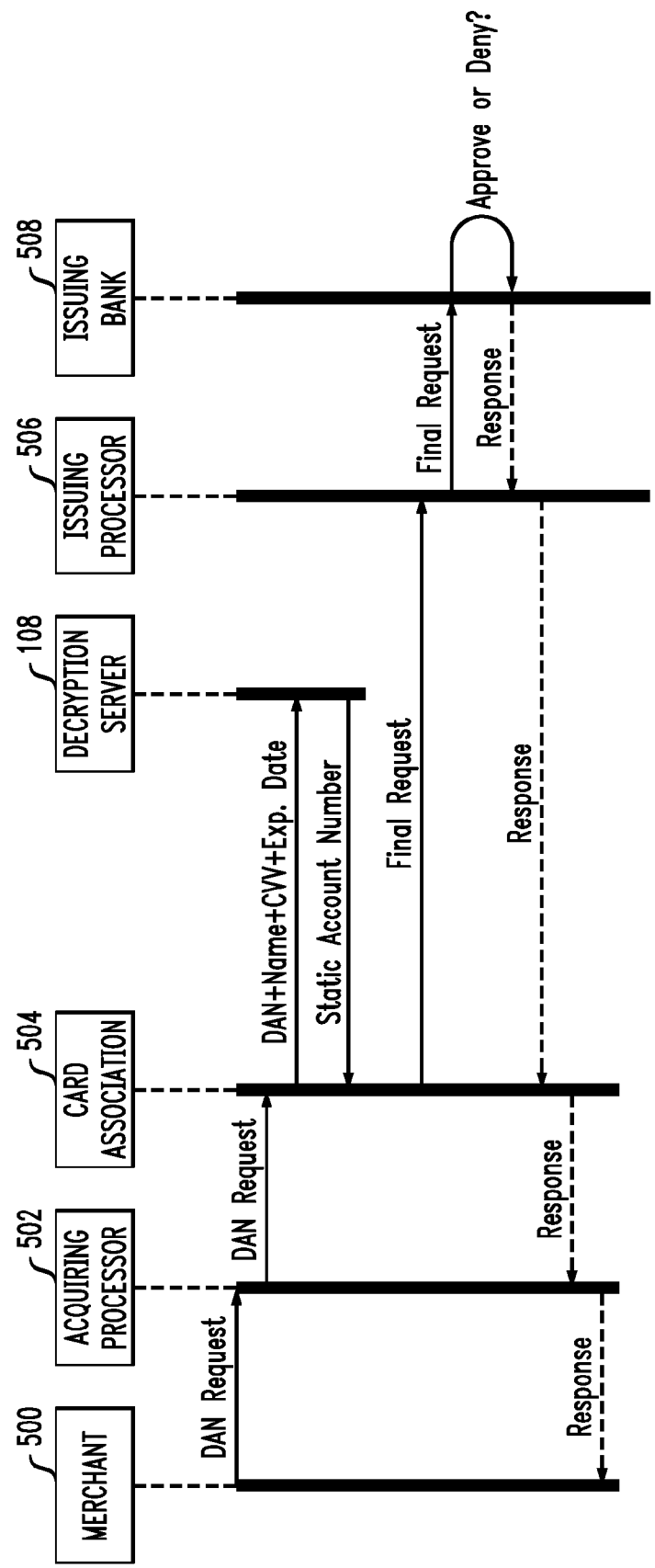

FIG. 6 shows an alternative embodiment in which the decryption server 108 is arranged between the card association 504 and the issuing processor 506. In this embodiment, the decryption server receives the dynamic account number, card holder name, CVV and expiration date from the card association via the merchant 500 and acquiring processor 502, and returns the corresponding static account number to the card association. The card association then includes the static account number in a final request that is sent directly to the issuing processor 506. The issuing processor sends the final request to the issuing bank 508, which approves or denies the request. The associated response, indicative of approval or denial of the request, goes from the issuing bank to the issuing processor, to the card association, then on to the acquiring processor, and finally back to the merchant.

Figure 7:
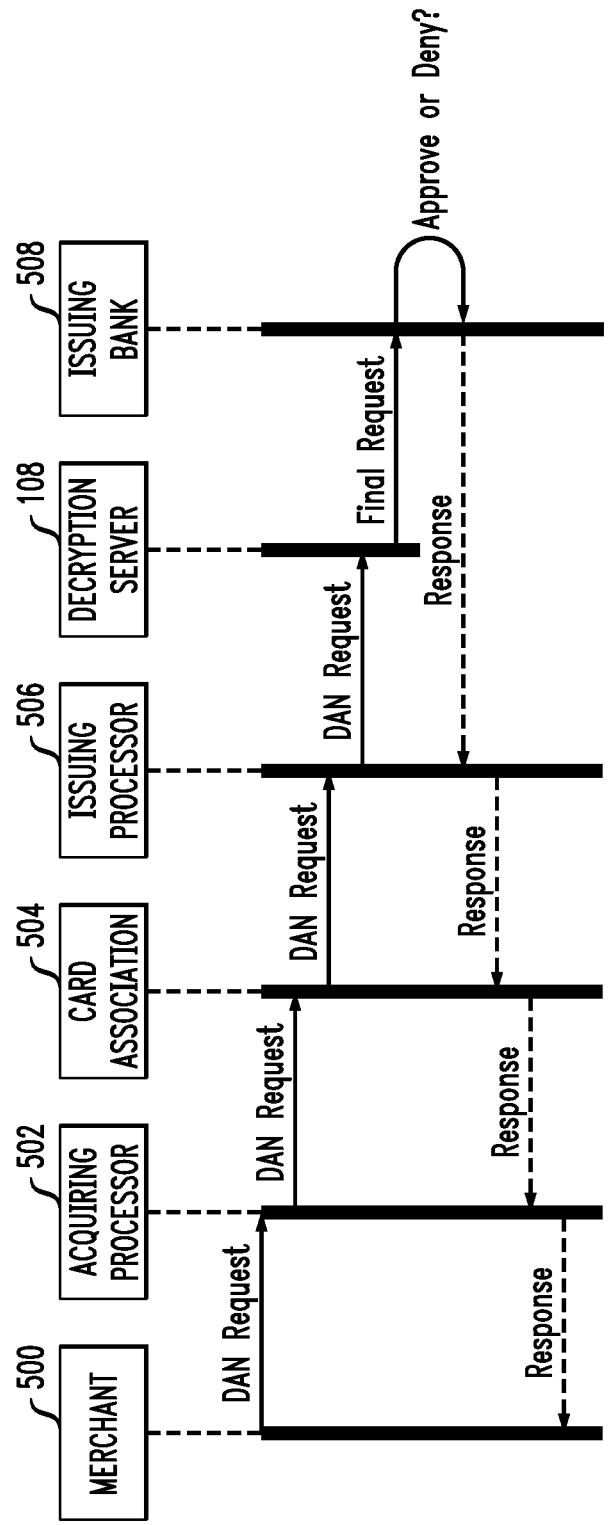
Figure 8:
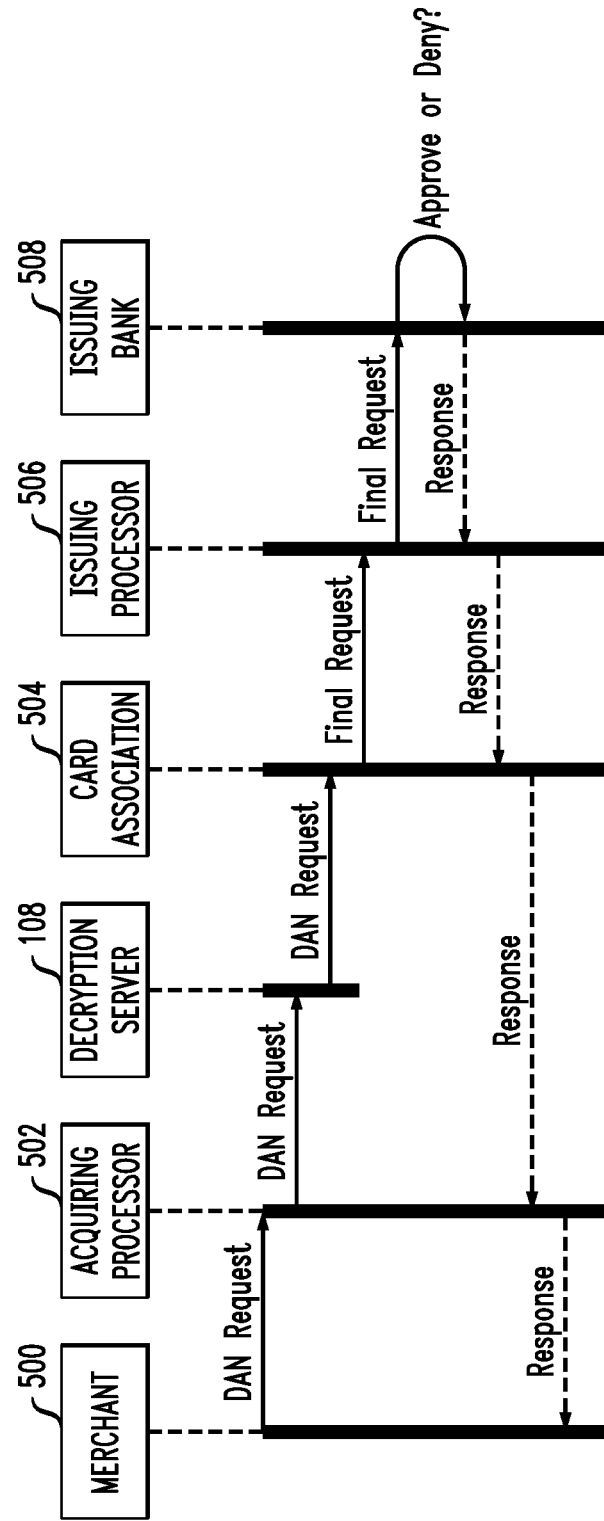

FIGS. 7 and 8 are examples of an interceptor model of payment card processing in which the decryption server 108 intercepts the DAN request generated by the merchant 500 and formulates a final request containing the static account number. This final request is then passed on to the issuing bank 508 which generates an associated response, indicative of approval or denial of the request. The response is then returned to the merchant.

In FIG. 7, the decryption server 108 is arranged between the issuing processor 506 and the issuing bank 508, while in FIG. 8, the decryption server is arranged between the acquiring processor 502 and the card association 504. Other arrangements of the various system elements, and corresponding processing models, may be used in alternative embodiments. For example, debit card embodiments may transmit a user PIN for verification in addition to the dynamic account number.

The embodiments of FIGS. 5 through 8 may make use of standard messaging formats, suitably adapted to implement the described techniques. For example, the DAN request received by the decryption server 108 in the FIG. 7 or FIG. 8 embodiment may comprise an ISO 8583 Interchange Message which contains the dynamic account number, the card holder name, CVV and expiration date. The decryption server in such an embodiment parses out the dynamic account number, card holder name, CVV and expiration date, converts the dynamic account number to a static account number used by the issuing bank, and generates a new ISO 8583 Interchange Message in which the dynamic account number is replaced by the static account number.

The responses transmitted back to the merchant in these embodiments may follow substantially the same ISO 8583 Interchange Message format as the request. Such responses may include, for example, response codes indicative of approval or denial of the transaction, authorization codes for later reference, and so on. The responses may include the dynamic account number rather than the static account number. However, use of the static number in responses may facilitate tracking of transactions for processing entities such as the merchant and card association.

The particular processing arrangements shown in FIGS. 5 through 8 are presented by way of example only. For example, a given decryption server may be configured to look up a static account number based on provided information, and then calculate its own dynamic account number for comparison with a dynamic account number in the request. Thus, the decryption server need not actually decrypt a provided dynamic account number, but can instead in effect perform such a decryption by independently generating the dynamic account number and comparing it to the provided dynamic account number. As noted above, the term "decryption server" as used herein is intended to be construed generally, so as to encompass such generate and compare arrangements.

Synchronization between a given payment card and a decryption server or other processing entity that determines a static account number based on a dynamic account number may be implemented using well-known OTP synchronization techniques, such as those used in with the above-noted conventional user authentication tokens.

Figure 9:
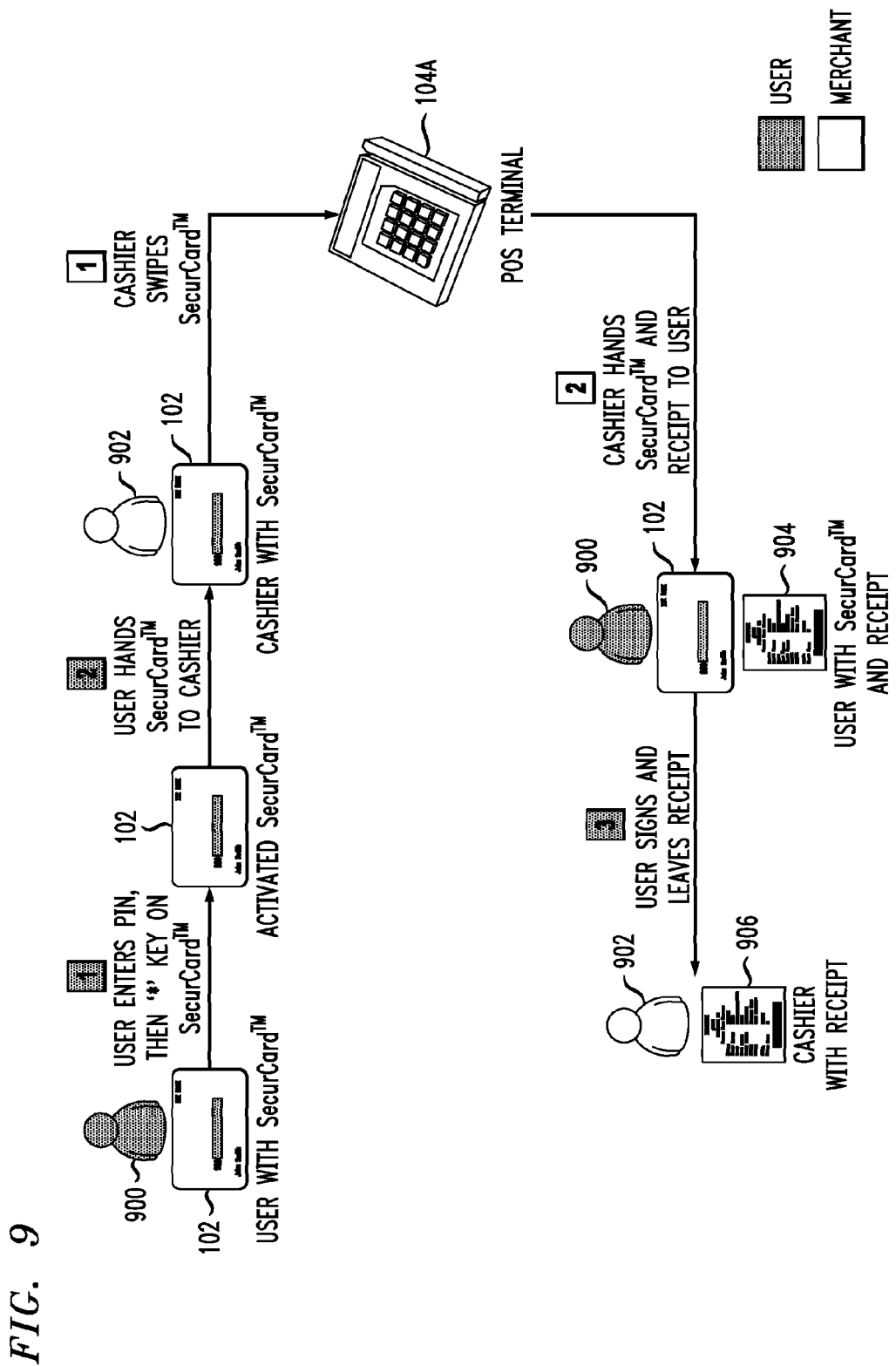
FIGS. 9 and 10 illustrate respective point-of-sale and online transactions carried out using a payment card in the FIG. 1 system.
Figure 10:
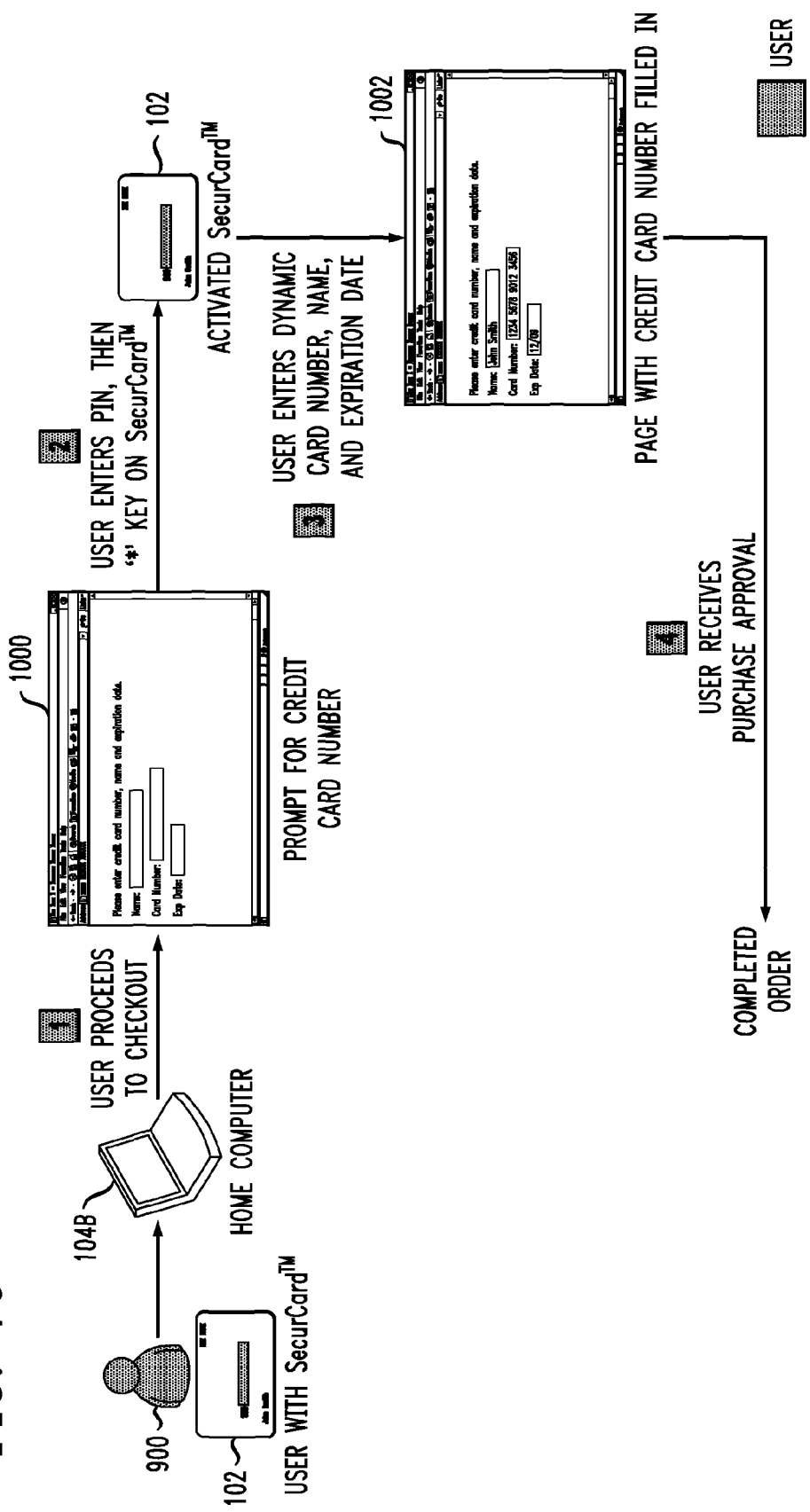

FIGS. 9 and 10 illustrate respective point-of-sale and online transactions implemented using the dynamic secure payment card 102 in the system 100 of FIG. 1. The payment card 102 in FIGS. 9 and 10 is referred to as a SecurCard™. It should be noted that these particular transactions are presented by way of example only, and the payment card may be used in a wide variety of other types of transactions.

Referring initially to FIG. 9, a user 900 with the payment card 102 enters a PIN then presses the * button using a keypad on the card, resulting in an activated card. The user then hands the card to a cashier 902 associated with a particular merchant. The cashier swipes the card through a point-of-sale (POS) terminal 104A, and the dynamic card number and other information is extracted and processed in the manner previously described. Assuming that the transaction is approved based on the dynamic account number, the user 900 receives the payment card and a receipt 904 for the transaction. The cashier is also left with a receipt for the transaction.

FIG. 10 shows an example of an online transaction initiated by user 900 having payment card 102. In this embodiment, the user is equipped with a personal computer 104B having a browser for accessing web pages associated with online merchants. The user selects an item for purchase via one of these web pages, and proceeds to checkout. A checkout web page 1000 prompts the user for a credit card number. In response, the user activates the payment card by entering its PIN and pressing the * button using the keypad of the card. A dynamic account number is presented to the user via the display of the card. The user then enters the dynamic account number, as well as other information such as the card holder name and expiration date into the web page 1000, resulting in a filled-in web page 1002. The information entered in this web page is processed as previously described, resulting in an approval or denial of the transaction. Assuming the transaction is approved, the user receives a response indicative of purchase approval, and the order is completed.

As mentioned above, many other types of transactions may be supported. For example, recurring payments may be supported. In such an embodiment, merchants may be provided with add-on software for their web sites that is configured to permit acceptance of a current dynamic account number as authorization for future payments.

The illustrative embodiments described above advantageously improve the security of payment card processing, without requiring substantial changes to payment card infrastructure or resulting in significant processing delays.

It should again be emphasized that the above-described embodiments of the invention are presented for purposes of illustration. Many variations and other alternative embodiments may be used. For example, although described in the context of payment cards utilizing time-based or event-based OTP algorithms, the disclosed techniques are applicable to a wide variety of other types of payment cards and dynamic account number generation techniques. Also, the particular configuration of system and device elements shown in FIGS. 1 through 4, and their interactions as shown in FIGS. 5 through 10, may be varied in other embodiments. For example, the particular configuration of the dynamic account number and the manner in which it is verified in the system may be varied in alternative embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A payment card comprising:
a processor for determining a dynamic account number;
a trigger source coupled to the processor; and
a display for outputting at least a portion of the dynamic account number under control of the processor responsive to the trigger source;
wherein the dynamic account number is based at least in part on a seed stored in the payment card and an output of the trigger source; and
wherein at least a portion of the dynamic account number replaces a corresponding portion of a static account number associated with the payment card.

2. The payment card of claim 1 wherein the dynamic account number comprises a first portion that is fixed and a second portion that is variable and generated under control of the processor.

3. The payment card of claim 2 wherein the fixed first portion of the dynamic account number is presented in a visually-perceptible manner on a surface of the card and the variable second portion is presented via the display.

4. The payment card of claim 2 wherein the fixed first portion comprises a designated number of initial digits of the dynamic account number.

5. The payment card of claim 2 wherein the variable second portion comprises a designated number of final digits of the dynamic account number.

6. The payment card of claim 1 wherein the dynamic account number comprises a card verification value at least a portion of which is variable and generated under control of the processor.

7. The payment card of claim 1 wherein the dynamic account number is generated utilizing one-time password algorithm program code executed by the processor.

8. The payment card of claim 1 wherein the trigger source comprises a time of day clock and the dynamic account number is based at least in part on the seed stored in the payment card and a current value of the time of day clock.

9. The payment card of claim 1 wherein the trigger source comprises an event counter and the dynamic account number is based at least in part on the seed stored in the payment card and a current value of the event counter.

10. The payment card of claim 1 wherein the display outputs at least a portion of the dynamic account number under control of the processor responsive to activation of the card via an input device of the payment card.

11. The payment card of claim 10 wherein the trigger source comprises the input device.

12. The payment card of claim 10 wherein the input device comprises at least one button with the card being activated based at least in part on user actuation of said button.

13. The payment card of claim 12 wherein the input device comprises a keypad with the card being activated based at least in part on user entry of a personal identification number via the keypad.

14. The payment card of claim 1 further comprising memory configured to store the seed and to store program code for generating at least a portion of the dynamic account number under control of the processor.

15. A server comprising:
a memory; and
a processor coupled to the memory;
the server being configured to receive a dynamic account number determined by a payment card and to determine a corresponding static account number, wherein the dynamic account number is based at least in part on a seed stored in the payment card and an output of a trigger source of the payment card.

16. The server of claim 15 wherein said server comprises a decryption server coupled between a merchant entity of a payment card processing system and an issuing bank entity of said system, the decryption server being configured to process a verification request containing the dynamic account number and to generate a modified verification request containing the corresponding static account number.

17. A method for use in a payment card, the payment card comprising a processor, a trigger source coupled to the processor, and a display, the method comprising the steps of:
receiving an output of the trigger source; and
determining by the processor a dynamic account number, at least a portion of which is output on said display, wherein the dynamic account number is based at least in part on a seed stored in the payment card and the output of the trigger source;
wherein at least a portion of the dynamic account number replaces a corresponding portion of a static account number associated with the payment card.

18. The method of claim 17 further comprising the step of providing the dynamic account number to a merchant entity of a payment card processing system.

19. A computer-readable storage medium storing executable program code that when executed by the processor of the payment card implements the steps of the method of claim 17.

20. A payment card processing system comprising:
a plurality of payment cards;
at least one host device configured for communication with one or more of the payment cards; and
at least one server configured for communication with the host device;
wherein at least one of the payment cards comprises a processor for determining a dynamic account number, a trigger source coupled to the processor, and a display for outputting at least a portion of the dynamic account number under control of the processor responsive to the trigger source, the dynamic account number being based at least in part on a seed stored in the payment card and an output of the trigger source;
wherein at least a portion of the dynamic account number replaces a corresponding portion of a static account number associated with the payment card;
wherein the dynamic account number is provided to the host device and communicated from the host device to the server; and
wherein the server is configured to determine the static account number from the dynamic account number.

21. The payment card processing system of claim 20 wherein said host device comprises a point-of-sale terminal.

22. The payment card processing system of claim 20 wherein said host device comprises a computer associated with a user of the payment card.

* * * * *